Nov. 12, 1940.　　　　　H. G. IRWIN　　　　　2,221,479
BELT TIGHTENER OF THE SPRING TYPE
Filed Feb. 2, 1940　　　　2 Sheets-Sheet 1
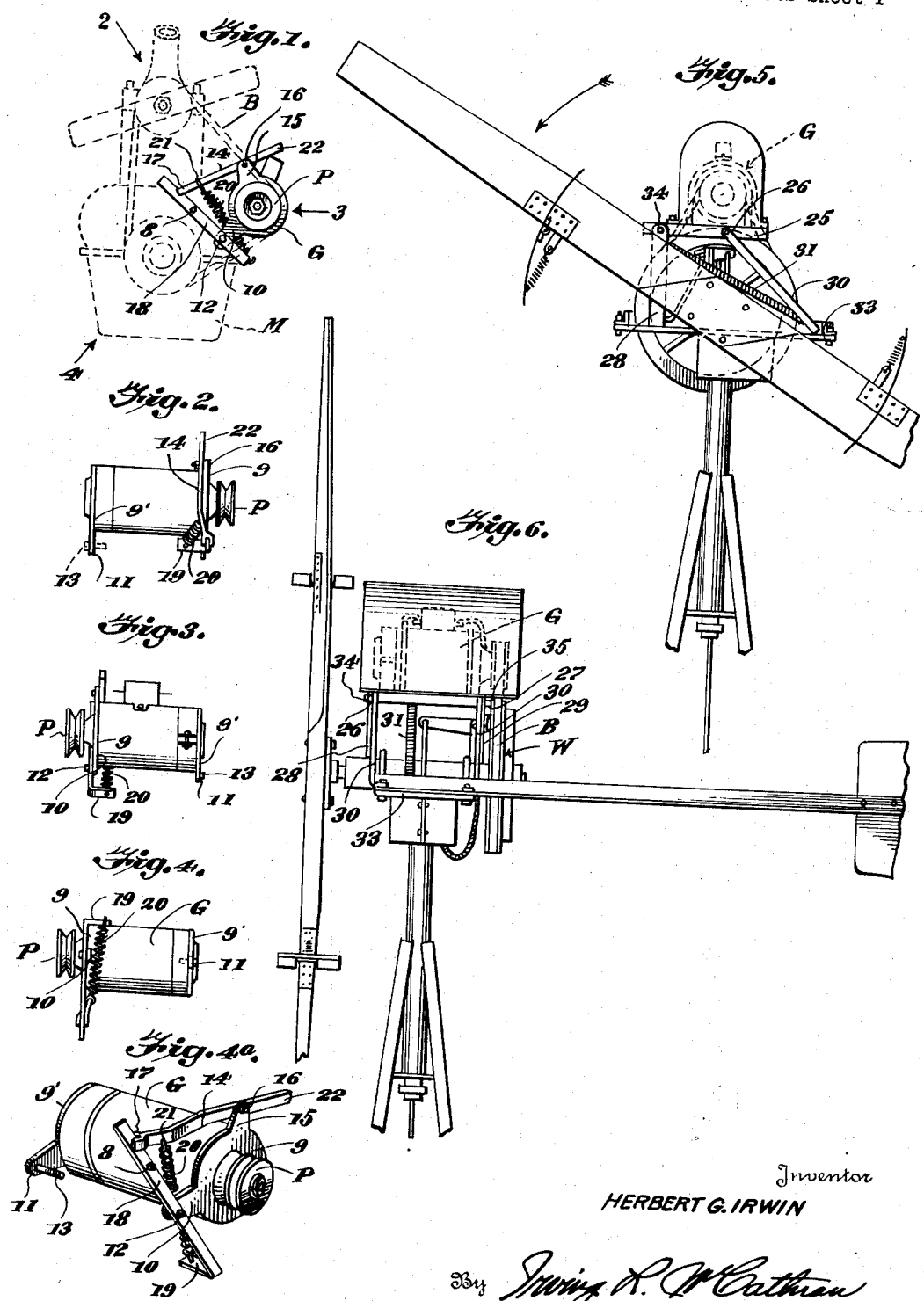
Inventor
HERBERT G. IRWIN
By Irving R. McCathran
Attorney

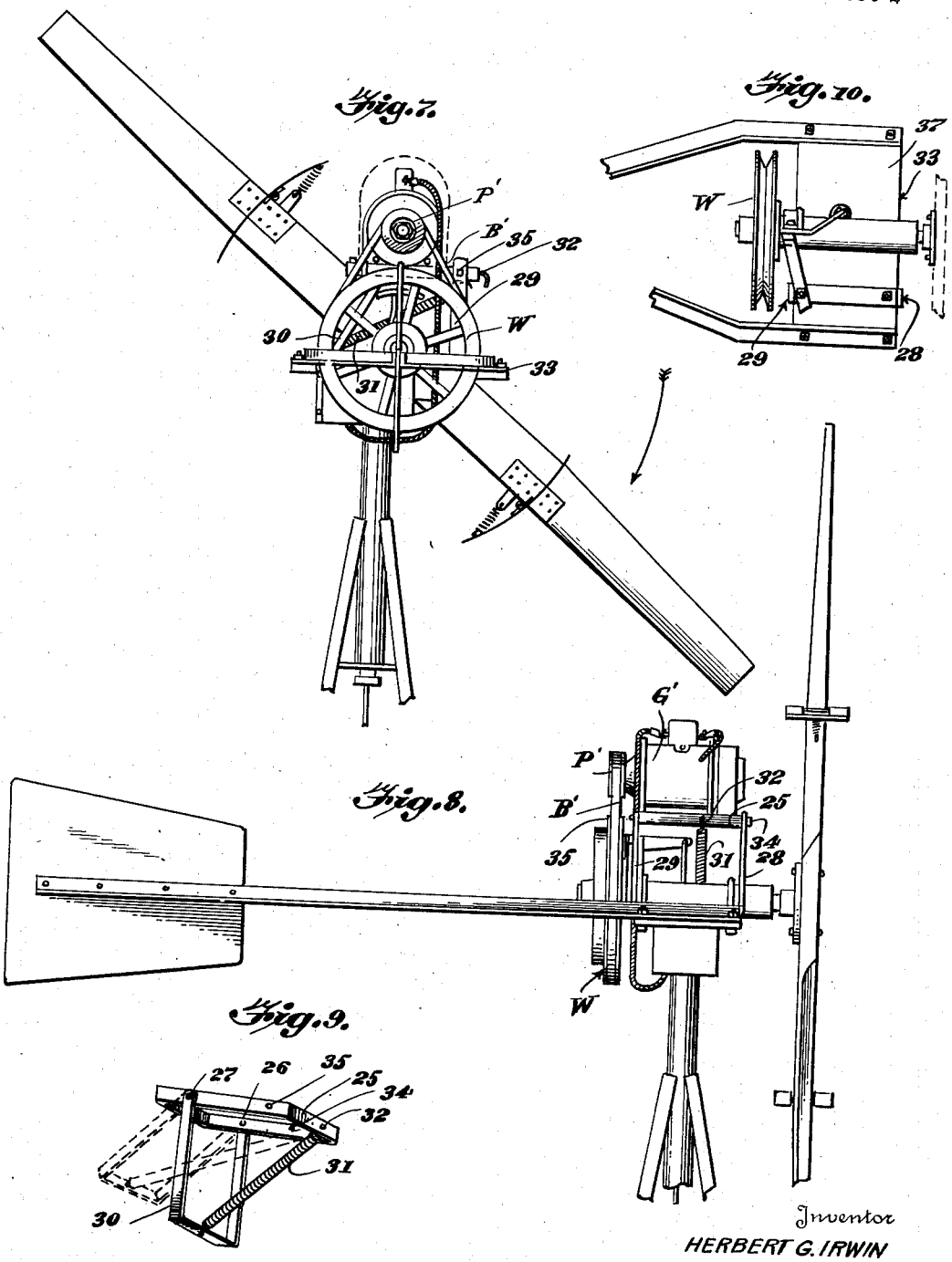

Patented Nov. 12, 1940

2,221,479

UNITED STATES PATENT OFFICE 2,221,479

BELT TIGHTENER OF THE SPRING TYPE

Herbert G. Irwin, Amarillo, Tex.

Application February 2, 1940, Serial No. 317,018

3 Claims. (Cl. 74—242.15)

My invention relates to belt tighteners of the spring type used in maintaining tension on drive belts of small electric generators or motors, and the primary object of my invention is the provision of means which will eliminate jerky or swaying motion of the generator or motor mounted for spring-pressed retraction, and operating with a belt tightener of the spring type.

A further object of my invention is the provision of means which combines rigidity with a spring for maintaining tension on a small electric generator or motor drive belt.

A further object of my invention is the provision of means which provides a back-movement obstruction to stabilize the generator or motor against back-pulling pressure of the drive belt, where a spring for tightening the belt of an electric generator or motor is used.

In the drawings:

Figure 1 is an end elevational view of the belt tightener showing the drive end of the generator;

Figure 2 is a side view of the generator looking in the direction of arrow 2;

Figure 3 is a side view of the generator looking in the direction of arrow 3;

Figure 4 is a side view looking in the direction of arrow 4;

Figure 4a is a perspective view of the generator and belt tightener;

Figure 5 is a front view of a wind power belt drive;

Figure 6 is a side view of the mechanism shown in Figure 5;

Figure 7 is a rear elevational view of the mechanism shown in Figures 5 and 6;

Figure 8 is a side elevational view looking at the opposite side to that shown in Figure 6;

Figure 9 is a perspective view of the generator mount shown in Figures 5 to 8 inclusive; and Figure 10 is a top plan view of the base upon which the mechanism shown in Figures 5 to 8 operates.

By referring to the drawings, it will be seen that M designates an automobile motor having provision for pivot attachment laterally thereto of an electric generator G, with a belt pulley P. The generator G is provided with end plates 9 and 9' having projections 10 and 11 respectively, for pivot attachment to the motor case by means of pivot screws 12 and 13 respectively, the screw 12 securing the front or pulley end of the generator and the screw 13 securing the rear or opposite end of the generator. A suitable belt drive B is employed for driving the pulley P.

The belt tightener consists of a spring for bodily moving the generator so as to press the generator drive pulley into a bight of the drive belt B, and a spring-pressed prop is provided to prevent back-movement of the generator by back-pulling pressure exerted by the drive belt while in operation. By noting particularly Figures 1 to 4a inclusive, it will be seen that the prop is designated by the numeral 14 and this prop is pivotally attached, as at 16, to a projection 15 of the plate 9 which is located adjacent the pulley P. The prop 14 is preferably provided with a bifurcated outer end 17 which contacts with and preferably straddles the outer end of the abutment bar 18. This abutment bar 18 is attached in position onto the motor case by means of the screws 8 and 12, as shown in Figure 1.

The abutment bar 18 is provided with an inwardly turned end 19 at a point a short distance beyond the position of the pivot screw 12 and this inwardly bent end 19 extends under the generator G and longitudinally thereof for a sufficient distance to provide an anchorage for one end of the spiral pull spring 20, the opposite end of the spring 20 being attached to the prop 14 near its outer end at the point indicated by the numeral 21. The inner end of the prop 14 extends beyond projection 15 to provide a handle for lifting the prop out of contact with the abutment bar 18 and to permit the pushing of the generator backward on its pivots with the hand should it become necessary to loosen the drive belt for the purpose of removing the same from the pulley P or for the purpose of replacing an old drive belt with a new one.

The operation of the type of structure illustrated in Figures 1 to 4a is as follows: The generator G is freely movable upon the aligned pivot screws 12 and 13 and the spring 20 pulls the contact end 17 of the prop 14 into sliding contact with the outer end of the bar 18 and tends to pull the bifurcated end 17 of the prop 14 toward the generator thereby causing the prop 14 to exert pressure on the pivot 16 which will move the generator bodily toward the bight of the belt B and thereby cause the pulley P to be forced into the bight of the belt B. Compensation for the stretch of the drive belt B or slack due to wear on the pulley contact surface of the belt, or wear on the contact surface of the pulley P or the belt drive wheel of the motor M, are made by the constant pressure of the spring 20 tending to pull the bifurcated end 17 of the prop 14 and causing this bifurcated end to slide downwardly upon the abutment bar 18 in the direction of the generator G, thereby moving the generator bodily in the direction toward the bight of the belt B shown in Figure 1 and causing the pulley P to be forced further into the bight of the drive belt.

Various pulling pressures of the belt B, such for instance as during the operation at various running speeds and under various loads, tend to pull back on the generator somewhat and tend to exert a back-pulling pressure in an opposite direction to the pull of the spring 20 and this would tend to cause unnecessary spring and pivot movement were it not for the present construction, wherein the various back-pulling pressures of the drive belt on the generator are opposed by the prop 14. Back-movement of the generator on its pivot screws 12 and 13 is obstructed by the prop 14 thereby stabilizing the generator against swaying motion.

I have shown a modified type of the invention in Figures 5 to 10 inclusive, wherein the same principle as that above described is applied to a mechanism of a slightly different type. In this structure as illustrated in Figures 5 to 10 inclusive, there is preferably employed a V type belt B' disposed on the generator pulley P' and the belt drive wheel W. The generator G' in the present instance is attached to a generator mount or platform 25 for retraction and one end of the mount 25 is attached by aligned pivots 34 and 35 to the rigid upright supports 28 and 29—note Figure 8. Attached to the mount or platform 25 by aligned pivots 26 and 27 is the open end of a U-shaped prop 30, shown in Figure 9, to the lower end of which is connected the lower end of a spiral pull spring 31, the upper end of the spring 31 being connected, as at 32, to the pivot end portion of the generator mount or platform 25. The lower end of the prop 30 is positioned to contact with a portion of the base plate 33 and to move thereon through the medium of the pulling pressure of the spring 31, which spring is adapted to function as a lifting means for the generator by swinging the generator mount or platform 25 on its pivots 34 and 35 located at the upper ends of the standards 28 and 29, which standards are carried by the base plate 33, as shown in Figure 5. This action will press the generator pulley P' into the bight of the drive belt B' tending to tighten the belt.

The lifting movement of the spring 31 is limited to the distance of movement of the prop 30 upon the prop contact surface 37 of the base plate 33 on which the lower end of the prop 30 is adapted to move, the limit of the movement being indicated from the extended inclined position of the prop shown in Figures 5 and 7 to the upright position which would be directly below the pivots 26 and 27. It should be understood that the constant pull of the spring 31 on the prop 30 toward the upright position tends to keep the generator pulley P' pressed sufficiently in the bight of the belt B' to prevent slipping on the pulley, and because of the structure illustrated and described, the prop 30 will provide a substantial obstruction against various back-pulling pressures of the drive belt, thereby stabilizing the generator and its mount or platform against unnecessary jerky motion.

It will be noted that various portions of the associated mechanism with which the present device is adapted to operate are illustrated in a general way merely for the purpose of clearly showing the adaptation of the present invention to various types of construction.

Having described the invention, what I claim is:

1. A tightener for the drive belt of an electric generator mounted for retraction including a spring for pressing the generator pulley in a bight of the drive belt and a laterally movable spring-pressed prop for stabilizing the generator bodily against movement by various pulling pressures of the drive belt.

2. A tightener for the drive belt of electric generators and the like comprising a supporting means mounted for retraction, a spring adapted to press the generator pulley into a bight of the conventional belt drive, and a laterally movable spring-pressed prop for bodily stabilizing the generator against movement by various pulling pressures of the drive belt.

3. A tightener for the drive belt of an electric generator and the like, comprising a prop pivotally mounted adjacent the generator, an abutment member mounted adjacent the generator, spring means anchored at one end and engaging the prop and tending to move the prop with respect to the abutment member for bodily moving the generator and its conventional belt-engaging pulley into the bight of a drive belt and stabilizing the generator against movement by various pulling pressures of the drive belt.

HERBERT G. IRWIN.